March 13, 1951     C. J. BLOM     2,545,422
MOTOR PUMP

Filed Feb. 13, 1945     3 Sheets-Sheet 1

March 13, 1951     C. J. BLOM     2,545,422
MOTOR PUMP

Filed Feb. 13, 1945     3 Sheets-Sheet 3

Inventor
Carl J. Blom
By Lyon & Lyon
Attorneys

Patented Mar. 13, 1951

2,545,422

UNITED STATES PATENT OFFICE 2,545,422

MOTOR PUMP

Carl J. Blom, San Marino, Calif., assignor to Byron Jackson Co., Vernon, Calif., a corporation of Delaware Application February 13, 1945, Serial No. 577,696

14 Claims. (Cl. 103—87)

1

This invention relates to motorpumps, and more particularly to electric motorpumps; that is, apparatus in which the electric motor is surrounded by a fluid, either liquid, gas or air, which is excluded from access to the interior of the motor.

The present invention relates to those types of motorpumps which have means for maintaining a pressure inside the motor at all times equal to or higher than the pressure of the pumped fluid, and wherein the pressure inside the motor is maintained as high or higher than the suction pressure of the pump.

It is an object of this invention to provide such a motor-pump unit with a so-called "semi-effective" mechanical seal through which a certain fluid leakage may take place and to subject said seal to a pressure differential causing said leakage to take place in a predetermined direction.

The principal object of this invention is to provide a motorpump wherein said seal between the motor and its pump is subjected to the intake or low pressure side of the pump, whereas the sealing fluid contained within the motor is subjected to the discharge or high pressure side or to the pressure existing at an intermediate stage of the pump so that any leakage through the sealing means is outwardly towards the pump rather than inwardly towards the motor.

Another object is to provide a motorpump wherein a reservoir of substantial capacity is provided for the dielectric and lubricating fluid employed in the motor compartment, there being a free interchange of such fluid between the reservoir and the motor compartment as the motor cools and the fluid contracts, or as losses occur through sealing elements or other connections; the dielectric and lubricating fluid being maintained under pressure as long as the motor and its pump are in operation.

A further object is to provide a motorpump designed to handle fluids which are miscible in the dielectric or lubricating sealing fluid, or which might dilute and react chemically with the dielectric fluid or otherwise alter its properties, the pumped fluid and dielectric fluid being separated at all times either by a third fluid, which is inert and immiscible, with both the dielectric fluid and pumped fluid, or by other means preventing admixture of the pump fluid and the dielectric fluid while maintaining them in pressure transfer relation.

A still further object is to provide a motorpump of this character wherein the application of pressure in the motor compartment is fully automatic, involves no moving parts, and no attention other than periodic checking to ascertain whether or not the respective fluid levels are within the correct range.

With the above and other objects in view, as may appear hereinafter, reference is directed to the accompanying drawings, in which.

Figure 2:
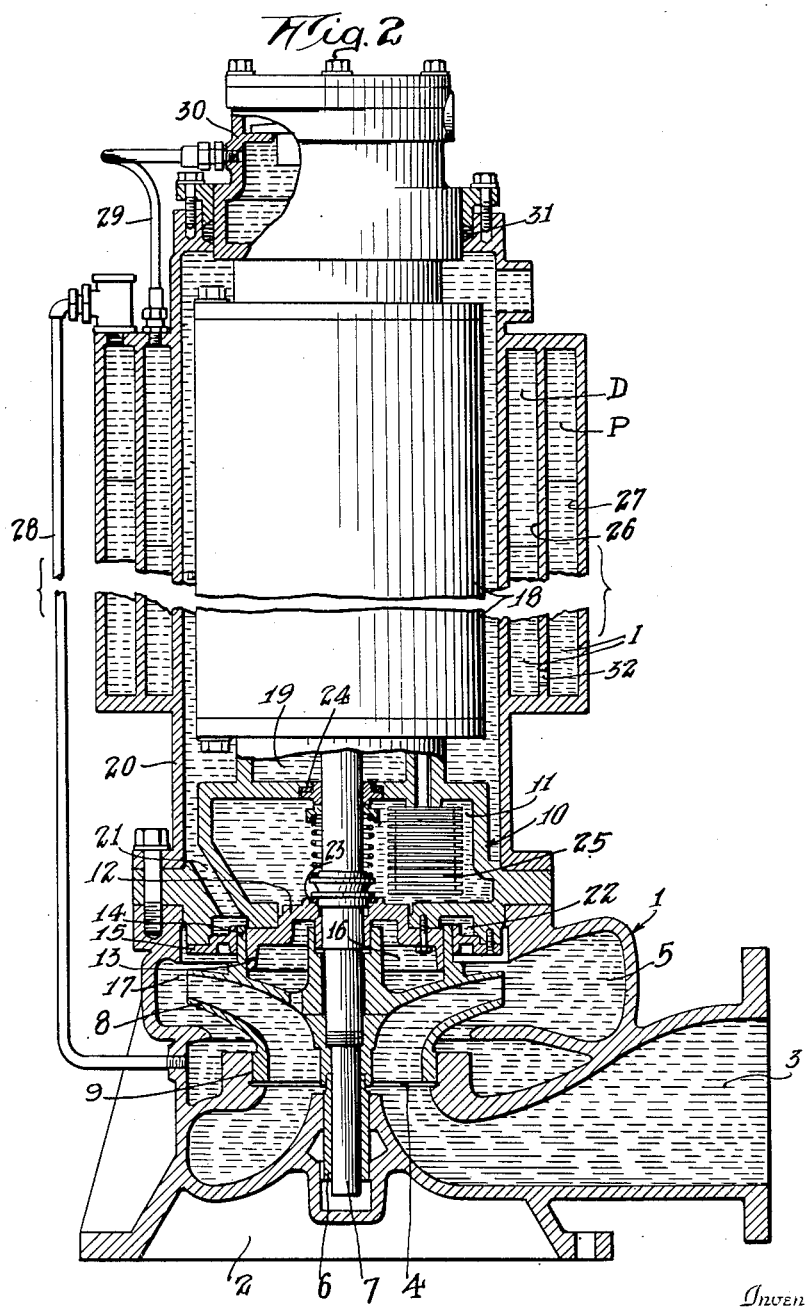
Fig. 2 is a similar longitudinal sectional view of a modified form of my motorpump.

Referring, first, to Fig. 2 of the drawings, a single stage pump unit, indicated generally by 1, includes a housing 2 which defines an intake volute 3, an impeller chamber 4 and a discharge volute 5. A central bearing 6 is provided within the annulus of the intake volute 3. An impeller shaft 7 extends upwardly from the bearing and carries an impeller 8 which fits within the impeller chamber 4. A suitable running seal means 9 is provided between the impeller 8 and the adjacent end of the intake volute 3.

The housing 2 of the pump unit supports a seal chamber housing 10 which defines a seal chamber 11. The lower end of the seal chamber is closed by a seal plate 12 having an annular skirt 13 adapted to form a running fit within a short cylindrical ring 14 extending upwardly from the impeller 8. A seal ring 15 is secured to the seal chamber housing 10 outwardly of the ring 14 and likewise forms a running fit therewith.

A low pressure zone 16 is formed between the impeller 8 and seal plate 12 by reason of communication through openings in the impeller communicating with the intake or low pressure side thereof. Below the seal ring 15 there is formed a high pressure zone 17 in communication with the discharge end of the impeller 8.

The seal chamber housing 10 supports a motor casing or shell 18 which provides a motor compartment 19 containing an electric motor, not shown. The seal chamber housing 10 also supports a jacket structure 20 which surrounds the motor shell at the seal chamber housing. The annular space defined between the jacket structure and the motor shell, as well as the seal chamber housing, is in communication through a passage 21 with a ring chamber 22 formed above the seal ring 15 and under the margin of the seal chamber housing 10. The ring chamber 22 receives a small proportion of the pumped fluid which flows between the seal ring 15 and the upstanding impeller ring 14, the clearance between these two rings being so predetermined that a film of pumped fluid capable of maintaining a desired motor temperature is bled from the discharging fluid being pumped.

The impeller shaft 7 extends upwardly through the seal chamber 11 into the motor compartment 19. Sealing units 23 and 24 are provided between the shaft and the seal plate 12 and between the shaft and upper wall of the seal chamber housing, respectively. The sealing units are described more fully in my copending application Serial No. 547,617, filed August 1, 1944, now Patent No. 2,404,783, dated July 30, 1946.

The seal chamber 11 and the motor compartment 19 are filled with a fluid having dielectric and lubricant properties. The sealing unit 24 is so arranged that if the pressure in the motor compartment 19 exceeds the pressure in the seal chamber 11, the sealing unit 24 will open to admit fluid. If, however, the pressure in the seal chamber 11 exceeds the pressure in the motor compartment 19, a bellows 25 located in the seal chamber but arranged with its interior in communication with the motor compartment, compresses to equalize the pressure. The bellows and its function is likewise more fully described in the above-mentioned copending application.

The structure 20 supports a pair of concentric reservoir jackets forming annular reservoirs 26 and 27. The outer reservoir 27 is connected by a pressure line 28 to a suitable point in communication with the discharge volute 5. A connecting line 29 communicates between the inner reservoir 26 and a motor head 30 which is provided at the upper end of the motor shell 18. The motor head is surrounded by a packing gland 31 which forms a closure for the upper end of the jacket structure 20.

The upper portion of the inner reservoir 26 contains the dielectric fluid designated at D which fills the motor compartment 19 and seal chamber 11. The dielectric fluid D rests on a heavier intermediate fluid I contained in the lower portion of the reservoir 26. The lower extremities of the reservoirs 26 and 27 are in communication by ports 32, so that the outer reservoir 27 likewise contains intermediate fluid I. The upper portion of the outer reservoir 27 is filled with the pumped fluid P. The interfaces between the intermediate liquid I, the dielectric fluid D, and the pumped fluid P move up and down in the intermediate portions of the reservoirs as the dielectric fluid expands or contracts but at all times the dielectric fluid is maintained under pressure equal to that existing at the discharge side of the impeller 8.

The intermediate fluid may be water; the dielectric fluid may be similar to that used in transformers, or any of the special combined dielectric and lubricating fluids which have been developed for motors of the type herein employed; the pumped fluid may be any gas or liquid which is immiscible with the intermediate fluid. In addition to mercury, such liquids as mercury or ethylene glycol have been found satisfactory for use as intermediate fluids, for example, where the pumped fluid is gasoline.

Figure 1:
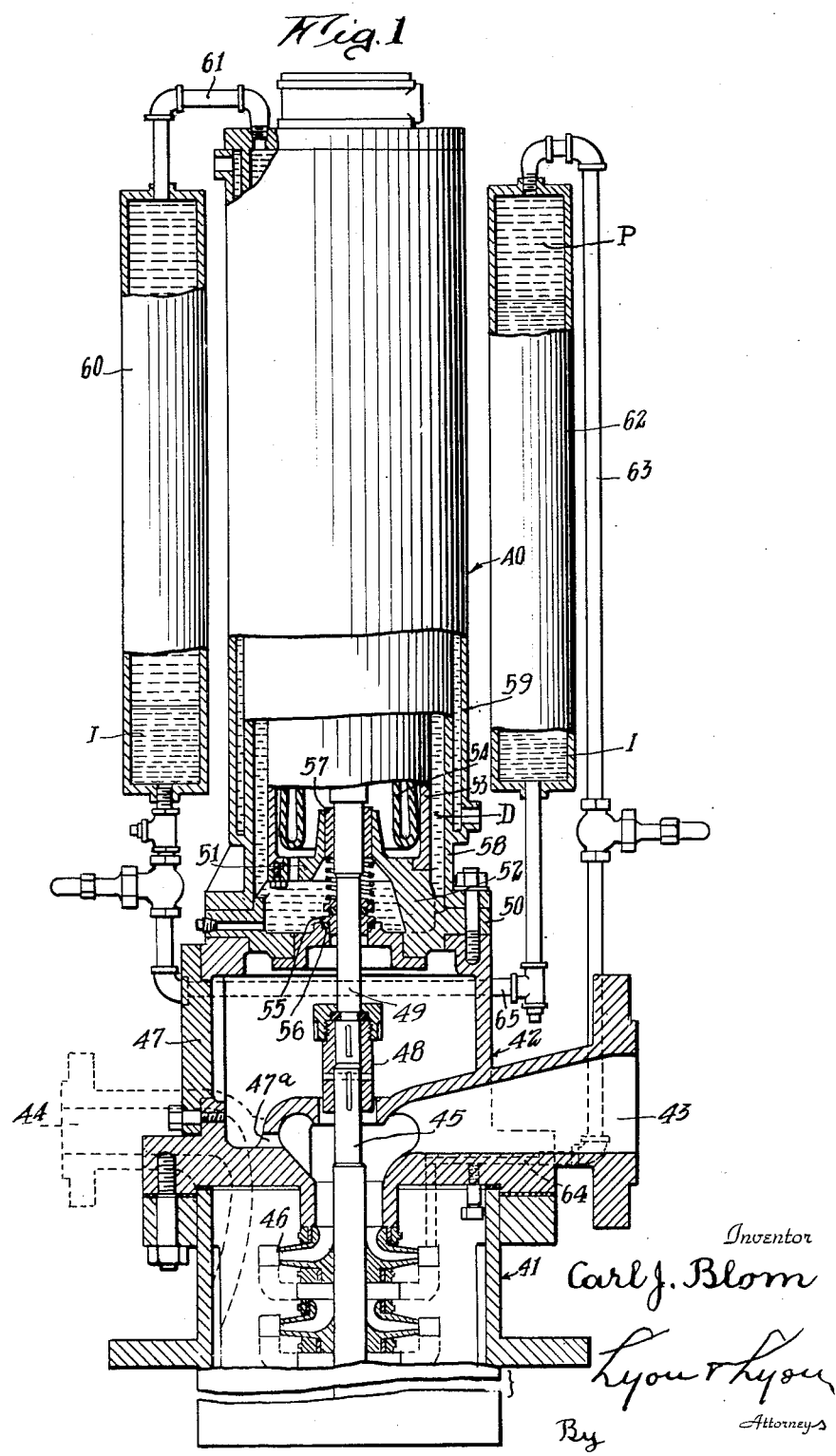
Fig. 1 is a longitudinal sectional, substantially diagrammatical, view of one form of my motor-pump, with portions thereof shown fragmentarily, or in elevation.

Reference is now directed to Fig. 1. In this construction my invention is adapted for use in conjunction with a multiple stage motorpump. The multiple stage pump unit indicated generally by 40 may be conventional and is therefore shown fragmentarily. It includes a head structure 42 which may define a suitable intake passage 43 and discharge passage 44, the latter being indicated by dotted lines, or it may in fact be displaced from the position indicated. The pump unit includes an impeller shaft 45 to which are secured a series of impellers 46, working in the usual impeller chambers. These chambers are suitably connected by passages to form various stages of the pump.

The impeller shaft extends from the pump unit through a suitable bearing and sealing gland into a cage 47 which forms the upper part of the head structure 42. Within the cage the impeller shaft 45 is joined by a coupling 48 to a motor shaft 49. The upper end of the head structure 42 supports a motor bracket 50 which, in this instance, is integrally connected to a bearing bracket 51 by webs, one of which is indicated at 52. The bracket 51 supports a stator shell 53 enclosing the stator 54 of an electric motor. A seal support ring 55 is fitted in the bottom plate 50 and receives the motor shaft 49. A seal element 56 is provided between the shaft and the seal support ring. The seal element is more fully disclosed in my aforementioned copending application. It will be observed that the interior of the cage 47 is in communication with the suction inlet 43 of the pump through port 47a. The lower side of the seal 56 is thus subjected to the suction pressure of the pump.

The bearing bracket 51 is provided with a bearing 57 through which extends the motor shaft 49.

The motor bracket 50 supports a motor case 58 which is spaced from the stator shell 53. The motor case 58, bracket 50 and seal support ring 55 define a container which is fluid-tight except for the shaft opening through the ring 55, and which is filled with a dielectric lubricating fluid D which is caused to circulate when the motor is in operation.

A cooling jacket 59 is provided around the motor case 58 and means are provided for circulating a cooling fluid therethrough.

The structure illustrated in Fig. 1 may be provided with the concentric jackets shown in Fig. 2, the jacket containing the pumped fluid being connected with the discharge end or some suitable intermediate stage of the multiple stage pump unit. In Fig. 1, however, the pumped fluid P and intermediate fluid I, as well as the excess dielectric fluid D, are contained in cylindrical reservoirs which are independent of the motor case 58. Thus a dielectric fluid reservoir 60, mounted at any suitable location, is connected through a pipe line 61 to the interior of the case 58. A second reservoir 62, also placed in any convenient location, is connected by a pipe line 63 to the pump unit 41. The connection may be made with the discharge end thereof, or, preferably, with some intermediate stage. For most cases, the pressure at the discharge end is higher than need be employed.

In Fig. 1 the pipe line 63 is shown as connected through a passage 64 to the discharge end of the first stage of the multiple pump unit. The bottom ends of the reservoirs 60 and 62 are connected by a pipe line 65. As in the first construction, the upper portion of the reservoir 62 contains pumped fluid P; the lower portions of both reservoirs contain an intermediate fluid I, whereas the upper portion of the reservoir 60 contains the dielectric fluid. The function of the reservoirs 60 and 62 is essentially the same as that of the structure shown in Fig. 2.

Figure 3:
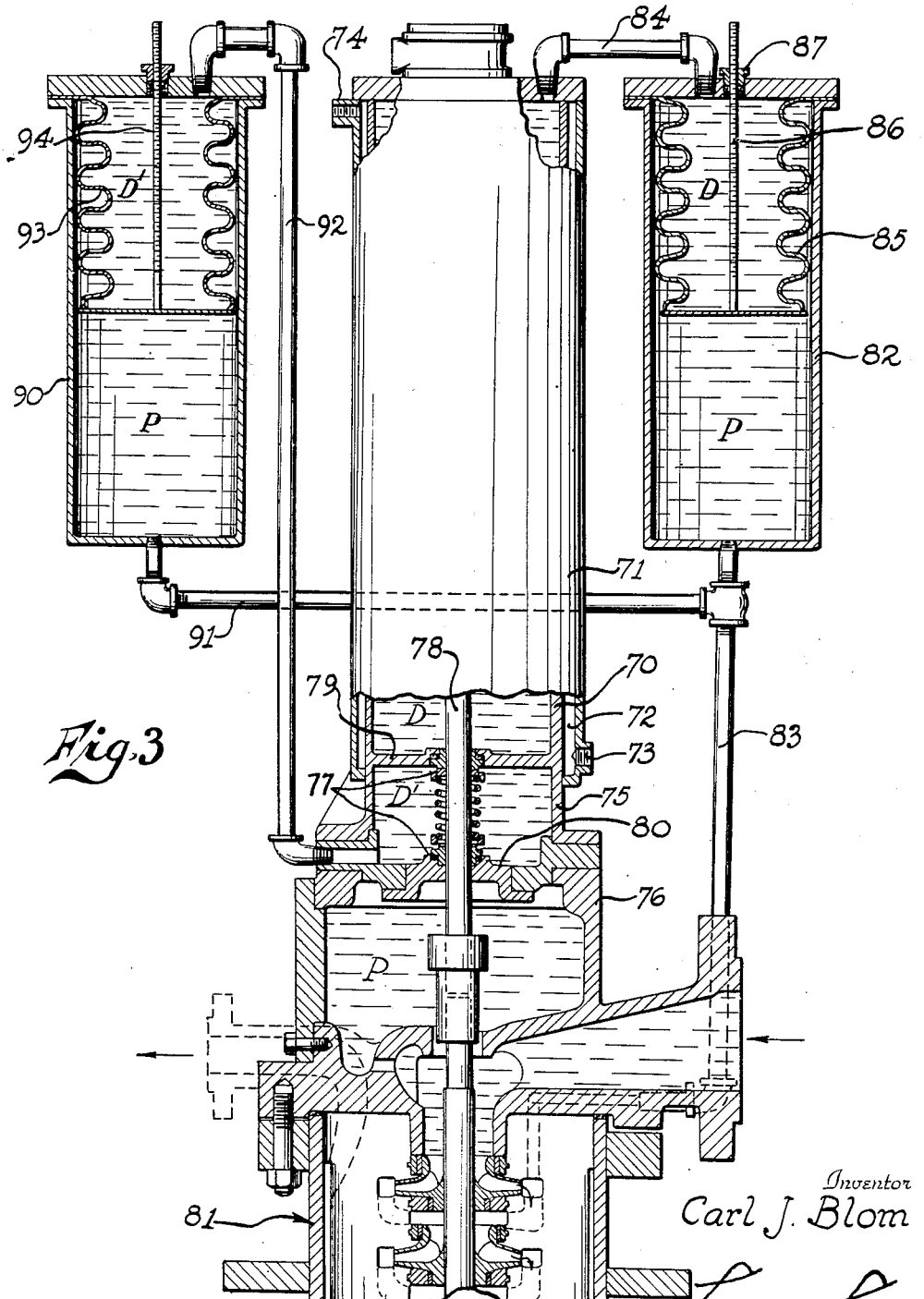
Fig. 3 is a similar longitudinal sectional view of still another form of motorpump embodying the invention.

Reference is now made to the embodiment shown in Fig. 3. In this instance the motor is housed within a chamber 70 which is surrounded by a cooling jacket 71 spaced from the motor chamber to provide an annular space 72 for circulation of cooling liquid between the inlet 73 and the outlet 74, as in Fig. 1. A seal chamber 75, however, is provided between the motor chamber and the head structure 76 of the pump, and a double mechanical seal 77, similar to the seal 23, 24 of Fig. 2, seals the juncture of the motor shaft 78 with the upper and lower end walls 79 and 80 of the seal chamber. The pump, generally designated 81, may be of either the single stage or the multistage type, and is shown herein as a double case, multistage pump similar to that shown in Fig. 1.

The motor chamber 70 is filled with a dielectric fluid D, and the seal chamber 75 also contains a body of dielectric fluid D'. Whereas in Fig. 2 the pressures of the dielectric fluid filling the motor chamber and the seal chamber are substantially equalized by being arranged directly in pressure transfer relation with each other by the bellows 25, in the embodiment of Fig. 3 the pressures of these bodies of dielectric fluid D and D' are equalized independently of each other by subjecting each of them directly to the pressure of the pump fluid P in a high pressure zone of the pump.

Thus it will be observed that a pressure balance chamber 82 is connected at its lower end by a conduit 83 to the first stage volute of the pump, and is connected at its upper end by a conduit 84 to the interior of the motor chamber. A bellows 85 is mounted within the chamber 82 and divides the latter into two compartments communicating respectively with the conduits 83 and 84. The bellows is extensible and contractible through a large range, to provide a reservoir of large capacity to compensate for leakage of a considerable quantity of dielectric fluid past the seal 77 before replenishment is necessary. The bellows may be constructed of canvas or other flexible material, suitably treated to be inert to chemical action by either the pump fluid or the dielectric fluid, and also to render it impervious to those fluids. An indicating rod 86 may, if desired, be connected at its lower end to the end wall of the bellows and may extend upwardly through a stuffing box 87 and may be provided with graduations to furnish a visual indication of the condition of expansion or contraction of the bellows.

This form of balance chamber finds particular utility in those instances where the pump fluid is of such a nature that a suitable intermediate liquid I, as in Figs. 1 and 2, is not available to separate the pump fluid and the dielectric fluid. It will be apparent that the bellows 85 of Fig. 3 performs the same dual function as does the intermediate liquid I of Figs 1 and 2—namely, that of preventing admixture of the pump fluid and the dielectric fluid in the motor chamber while establishing pressure transfer relation between those fluids.

In a similar manner, the dielectric fluid D' in the seal chamber 75 is subjected to the pressure of the pump fluid P in a high pressure zone of the pump. A second balance chamber 90, which may be identical in all respects with the balance chamber 82, is connected at its lower end, by a conduit 91, to the conduit 83, and is connected at its upper end by a conduit 92 to the seal chamber 75. A bellows 93 is mounted in the chamber 90 and divides the latter into two compartments communicating respectively with the conduits 91 and 92. An indicator rod 94, similar to the rod 86, may be provided to indicate the position of the bellows 93.

It will be apparent from the foregoing description of the embodiment shown in Fig. 3 that the pressure of the dielectric liquid in the motor chamber is equalized with that in the seal chamber, and the pressure in both chambers is slightly higher (herein by the pressure developed by one stage of the pump) than the pressure of the pump liquid contacting the lower side of the lower shaft seal, at the juncture of the motor shaft with the lower wall 80 of the seal chamber.

It will be understood that the single balance chamber 82 with its bellows 85 is not limited to use with a motor structure incorporating a double mechanical seal and a seal compartment, as in Fig. 2, but may be as effectively employed in conjunction with a motor having a single seal, as in Fig. 1. Furthermore, this type of pressure-balance device may also be used in conjunction with other means for establishing a predetermined pressure relation between the bodies of dielectric fluid in the motor and seal compartments, such as, for instance, the bellows 25 of Fig. 2 exposed on one side to the pressure of the dielectric liquid in the seal compartment and exposed on its other side to the pressure of the dielectric fluid in the motor compartment.

In each of the embodiments described above, the dielectric fluid in the motor case is protected from contamination by the pumped fluid. The single mechanical seal 56 of Fig. 1 is highly effective for this purpose when subjected to a pressure differential on the inner side thereof of the order of one stage pressure of the pump. The double mechanical seal of Figs. 2 and 3, of course, provides an added safety factor against leakage of pumped fluid into the motor case, and is considered preferable in instances where the pumped fluid is of a character to be particularly harmful to the motor.

An outstanding characteristic of all three embodiments, however, is the provision, in conjunction with either a single or a double mechanical seal, of means for subjecting the outer or pump side of the seal to the pressure prevailing in a relatively low pressure zone of the pump, and for subjecting the inner or motor side of the seal to the pressure prevailing in a higher pressure zone of the pump. The provision of a pressure equalizing chamber or chambers for transmitting the pressure of the pumped fluid in the higher pressure zone to the dielectric fluid through the intermediacy of means such as a third fluid which is immiscible with each of the other fluids, as in Figs. 1 and 2, or such as a bellows or other movable, imperforate wall as in Fig. 3, also serves another important purpose in conjunction with the use of a mechanical seal. Such seals are what may be appropriately termed semi-effective seals, that is, they permit a slight leakage between the seal faces from the high pressure side to the low pressure side. In the present instance, because of the higher pressure on the inner or motor side of the seal, the dielectric liquid leaks outwardly and must be replenished. The inner reservoir 26 of Fig. 2, the reservoir 69 of Fig. 1, and the reservoirs 82 and 90 of Fig. 3, are of sufficient capacity to compensate for any leakage of dielectric fluid which may take place over a long period of time.

Many other embodiments of the invention may be resorted to without departing from the spirit of the invention.

I claim:

1. A motorpump comprising: a motor housing enclosing a motor and containing a body of dielectric liquid; a pump casing containing a pumping element and having walls defining a relatively low pressure zone and a relatively high pressure zone, the interiors of said motor housing and said pump casing being sealed from the surrounding external medium, said pump casing having a suction inlet and a discharge outlet for pump liquid, and a second outlet communicating with said relatively high pressure zone; shafting connected to said motor and extending through a wall of said motor housing and connected in driving relation with said pumping element to cause said pumping element to pump liquid through said pump casing from said suction inlet to said discharge outlet; a semi-effective mechanical seal structure sealing the juncture of said shafting with said motor housing wall, said seal structure being exposed on one side to the pressure of the dielectric liquid in the motor housing and on its other side to the pressure of the pump liquid in said relatively low pressure zone; and means for subjecting the dielectric liquid in the motor housing to the pressure of the pump liquid in said relatively high pressure zone, comprising reservoir means containing bodies of dielectric liquid and pump liquid in communication respectively with said motor housing and said second outlet from said pump casing, and means interposed between said bodies of fluid for preventing admixture thereof with each other while maintaining said fluids in pressure transfer relation with each other.

2. A motorpump as set forth in claim 1, wherein said reservoir means is of sufficient capacity to provide for maximum thermal expansion of said dielectric liquid during operation of said motor, and to compensate for leakage of a substantial amount of dielectric liquid from said motor housing through said seal structure.

3. A motorpump comprising: a motor housing; a motor therein; a shaft extending from said motor through a wall of said housing; a pump unit driven by said shaft; a semi-effective mechanical seal structure sealing the juncture of said shaft and motor housing wall, said seal structure being exposed on one side to the pressure in a low pressure zone of said pump unit, and on its other side to the pressure in said motor housing; a pair of reservoirs connected in series between the interior of said motor housing and a point of elevated pressure in said pump unit, said reservoirs being connected together at their lower portions and communicating by their upper portions with said motor housing and said pump unit, respectively; a dielectric liquid filling the said motor housing and the upper portion of one of said reservoirs; a pumped liquid filling the upper portion of the other reservoir; and an immiscible liquid separating the dielectric liquid and the pumped liquid and in pressure transfer relation to both liquids.

4. A construction as set forth in claim 3, wherein said reservoirs are in the form of tubular casings disposed externally of said motor.

5. A motor pump comprising a motor housing enclosing a motor and containing a body of dielectric liquid; a pump casing containing a pumping element, the interiors of said motor housing and said pump casing being sealed from the surrounding external medium, said pump casing having a suction inlet and a discharge outlet for pump liquid; shafting connected to said motor and extending through a wall of said motor housing into said pump casing compartment and connected in driving relation with said pumping element to cause said pumping element to impel pump liquid through said pump casing from said suction inlet to said discharge outlet; a mechanical seal interposed between said motor housing and said pump casing, the pump side of said seal being subjected to the pressure developed by a relatively low pressure zone of said pump; and pressure transfer means subjecting the dielectric liquid in said motor housing compartment on the other side of said mechanical seal to the pressure developed by a relatively high pressure zone of said pump.

6. A motor pump as set forth in claim 5, wherein said motor housing includes a partition dividing said housing into a motor compartment and a sealing compartment each containing a body of dielectric liquid, said motor shafting extending from said motor compartment through said sealing compartment to said pump casing; and a second mechanical seal sealing the juncture of said shafting with said partition.

7. A motorpump as set forth in claim 5, wherein said pressure transfer means comprises a pair of jackets surrounding said motor housing and defining inner and outer reservoirs communicating with each other at their lower portions, their upper portions being in communication, respectively, with said motor housing and said relatively high pressure zone of said pump whereby said reservoirs contain, respectively, bodies of dielectric liquid and pump liquid; the lower portions of said reservoirs containing a body of a third liquid immiscible with and in pressure transfer relation with said bodies of dielectric liquid and pump liquid.

8. A motorpump as set forth in claim 5, wherein said pressure transfer means includes a reservoir communicating adjacent one end with said motor housing and adjacent its other end with said relatively high pressure zone of said pump; and an impervious partition in said reservoir dividing the latter into compartments containing respectively bodies of dielectric liquid and pump liquid isolated from each other, said partition being freely displaceable in response to pressure variations on opposite sides thereof whereby to maintain pressure equilibrium between said isolated bodies of dielectric liquid and pump liquid.

9. A motorpump as set forth in claim 5, wherein said pressure transfer means includes a reservoir communicating adjacent one end with said motor housing and adjacent its other end with said relatively high pressure zone of said pump; and an impervious partition in said reservoir dividing the latter into compartments containing respectively bodies of dielectric liquid and pump liquid isolated from each other, said partition being freely displaceable in response to pressure variations on opposite sides thereof whereby to maintain pressure equilibrium between said isolated bodies of dielectric liquid and pump liquid, and indicating means operatively connected to said partition and extending through a wall of said reservoir to the exterior thereof for indicating the position of said partition in said reservoir.

10. A motorpump as set forth in claim 5, wherein said pressure transfer means includes a reservoir communicating adjacent one end with said motor housing and adjacent its other end with said relatively high pressure zone of said pump; and a flexible bellows in said reservoir dividing the latter into compartments containing respectively bodies of dielectric liquid and pump liquid isolated from each other, said bellows being freely displaceable in response to pressure variations on opposite sides thereof whereby to maintain pressure equilibrium between said isolated bodies of dielectric liquid and pump liquid.

11. A motorpump as set forth in claim 5, wherein said motor housing includes a partition dividing said housing into a motor compartment and a sealing compartment each containing a body of dielectric liquid, said motor shafting extending from said motor compartment through said sealing compartment to said pump casing; a second mechanical seal sealing the juncture of said shafting with said partition; and wherein said pressure transfer means comprises a pair of reservoirs each communicating adjacent one end thereof with said relatively high pressure zone of said pump and communicating adjacent their other ends respectively with said motor compartment and said seal compartment; and an impervious partition in each reservoir dividing it into compartments containing respectively bodies of dielectric liquid and pump liquid isolated from each other, said partitions being freely displaceable in response to pressure variations on opposite sides thereof whereby to maintain pressure equilibrium between said bodies of dielectric liquid and pump liquid in each reservoir.

12. A motor pump comprising: a motor housing enclosing a motor and containing a body of dielectric liquid; a pump casing containing a pumping element; shafting connected to said motor and extending through a wall of said motor housing into said pump casing and connected in driving relation with said pumping element; a mechanical seal interposed between said motor housing and said pump casing and sealing the juncture of said shafting with said motor housing wall, said seal being exposed on one side to the pressure developed in a relatively low pressure zone of said pump; pressure transfer means subjecting the dielectric liquid in said motor housing on the other side of said mechanical seal to the pressure developed by a relatively high pressure zone of said pump, said transfer means comprising a pair of reservoirs connected in series between the interior of said motor housing and said relatively high pressure zone, said reservoirs being connected together at their lower portions and being each partially filled with a liquid immiscible either with said dielectric liquid or the pumped liquid and communicating by their upper portions with said motor housing and said pump unit respectively.

13. A motor pump comprising: a motor housing enclosing a motor and containing a body of dielectric liquid; a pump casing containing a pumping element and having walls defining a relatively low pressure zone and a relatively high pressure zone, the interiors of said motor housing and said pump casing being sealed from the surrounding external medium, said pump casing having a suction inlet and a discharge outlet for pump liquid, and a second outlet communicating with said relatively high pressure zone; shafting connected to said motor and extending through a wall of said motor housing and connected in driving relation with said pumping element to cause said pumping element to impel pump liquid through said pump casing from said suction inlet to said discharge outlet; a semi-effective mechanical seal structure sealing the juncture of said shafting with said motor housing wall, said seal structure being exposed on one side to the pressure of the dielectric liquid in the motor housing and on its other side to the pressure of the pump liquid in said relatively low pressure zone; and means for subjecting the dielectric liquid in the motor housing to the pressure of the pump liquid in said relatively high pressure zone, comprising reservoir means containing bodies of dielectric liquid and pump liquid in communication respectively with said motor housing and said second outlet from said pump casing.

14. A motor pump comprising: a motor housing enclosing a motor and containing dielectric liquid; a pump casing containing a pumping element and having walls defining a relatively high pressure zone and a relatively low pressure zone, the interiors of said motor housing and said pump casing being sealed from the surrounding external medium, said pump casing having a suction inlet and a discharge outlet for a liquid to be pumped, and having a second outlet communicating with said relatively high pressure zone; a shaft connected to said motor and extending through a wall of said motor housing into said pump casing and connected in driving relation with said pumping element to cause said pumping element to impel liquid to be pumped through said pump casing from said suction inlet to said discharge outlet; a mechanical seal interposed between said motor housing and said pump casing and sealing the juncture of said shaft with said motor housing wall; and a conduit leading from the second outlet of said pump casing connecting said relatively high pressure zone in pressure transfer relation with the dielectric liquid in said motor housing on one side of said mechanical seal, the other side of said mechanical seal being in communication with said relatively low pressure zone of said pump casing, whereby upon operation of said pump a substantially constant pressure differential is provided across said mechanical seal.

CARL J. BLOM.

REFERENCES CITED

The following references are of record in the file of this patent:

UNITED STATES PATENTS

| Number | Name | Date |
|---|---|---|
| 1,750,818 | Sauveur | Mar. 18, 1930 |
| 2,002,907 | Sessions | May 28, 1935 |
| 2,002,913 | Mendenhall et al. | May 28, 1935 |
| 2,002,915 | Mendenhall et al. | May 28, 1935 |
| 2,266,039 | Hollander et al. | Dec. 16, 1941 |
| 2,404,783 | Blom | July 30, 1946 |